(12) United States Patent
Ren et al.

(10) Patent No.: US 9,144,925 B2
(45) Date of Patent: Sep. 29, 2015

(54) SHAPE MEMORY POLYPHENYLENE SULFIDE MANUFACTURING, PROCESS, AND COMPOSITION

(75) Inventors: Jiaxiang Ren, Houston, TX (US); David P. Gerrard, Magnolia, TX (US); James E. Goodson, Porter, TX (US); Ping Duan, Cypress, TX (US); Gaurav Agrawal, Aurora, CO (US)

(73) Assignee: Baker Hughes Incorporated, Houston, TX (US)

( * ) Notice: Subject to any disclaimer, the term of this patent is extended or adjusted under 35 U.S.C. 154(b) by 379 days.

(21) Appl. No.: 13/343,264

(22) Filed: Jan. 4, 2012

(65) Prior Publication Data

US 2013/0168894 A1 Jul. 4, 2013

(51) Int. Cl.
*B29C 43/02* (2006.01)
*B29C 43/00* (2006.01)
*B29K 81/00* (2006.01)

(52) U.S. Cl.
CPC .......... *B29C 43/003* (2013.01); *B29K 2081/04* (2013.01)

(58) Field of Classification Search
CPC .......... B29B 9/02; B29B 9/04; B29C 43/006; B29C 43/02; B29C 43/14; B29C 43/003
USPC ........................................ 264/230, 115, 322
See application file for complete search history.

(56) References Cited

U.S. PATENT DOCUMENTS

| | | | |
|---|---|---|---|
| 2,466,963 A | 4/1949 | Patrick et al. | |
| 3,487,052 A | 12/1969 | Koons et al. | |
| 3,699,087 A * | 10/1972 | Brown et al. | 528/388 |
| 3,737,411 A * | 6/1973 | Scoggins | 528/388 |
| 3,782,458 A | 1/1974 | Slack | |
| 3,793,281 A | 2/1974 | Acle, Jr. | |
| 3,954,932 A * | 5/1976 | Coale | 264/122 |
| 4,020,054 A | 4/1977 | Fodor | |
| 4,137,970 A | 2/1979 | Laflin et al. | |
| 4,191,254 A | 3/1980 | Baughman et al. | |

(Continued)

FOREIGN PATENT DOCUMENTS

| | | |
|---|---|---|
| EP | 2009723 A1 | 12/2008 |
| JP | 59157151 A | 9/1984 |

(Continued)

OTHER PUBLICATIONS

Stacy, Molecular Weight Distribution of Polyphenylene Sulfide by High Temperature Gel Permeation Chromatography, 1986, Journal of Applied Polymer Science, vol. 32, pp. 3959-3969.*

(Continued)

*Primary Examiner* — Timothy Kennedy
(74) *Attorney, Agent, or Firm* — Cantor Colburn LLP

(57) ABSTRACT

Disclosed is a process for making shape memory polyphenylene sulfide, comprising: curing polyphenylene sulfide to produce cured polyphenylene sulfide; comminuting the cured polyphenylene sulfide to form cured polyphenylene sulfide particles; disposing the cured polyphenylene sulfide particles in a mold; heating the mold for flowing the cured polyphenylene sulfide; compressing, by applying a compressive force, the cured polyphenylene sulfide; cooling the cured polyphenylene sulfide; relieving the compressive force; and de-molding the cured polyphenylene sulfide to produce the shape memory polyphenylene sulfide.

37 Claims, 8 Drawing Sheets

(56) References Cited

U.S. PATENT DOCUMENTS

| | | | |
|---|---|---|---|
| 4,308,352 A | | 12/1981 | Knaus |
| 4,414,269 A | | 11/1983 | Lubowitz et al. |
| 4,415,269 A | | 11/1983 | Fraser |
| 4,431,761 A | | 2/1984 | Hergenrother |
| 4,475,847 A | | 10/1984 | Cornely et al. |
| 4,591,615 A | | 5/1986 | Aldred et al. |
| 4,690,972 A | * | 9/1987 | Johnson et al. ............... 524/609 |
| 4,862,967 A | | 9/1989 | Harris |
| 4,940,733 A | | 7/1990 | Kuphal et al. |
| 5,086,125 A | * | 2/1992 | Ohta et al. .................... 525/432 |
| 5,272,247 A | | 12/1993 | Sotokawa et al. |
| 5,488,084 A | * | 1/1996 | Kadoi et al. .................. 524/423 |
| 5,580,931 A | | 12/1996 | Aguirre |
| 5,789,083 A | | 8/1998 | Thomas |
| 5,803,172 A | | 9/1998 | Rajkovich |
| 5,886,130 A | | 3/1999 | Trimmer et al. |
| 5,976,437 A | | 11/1999 | Marrocco, III et al. |
| 6,001,934 A | | 12/1999 | Yamanaka et al. |
| 6,160,239 A | | 12/2000 | Cubero Pitel |
| 6,446,717 B1 | | 9/2002 | White et al. |
| 6,485,806 B1 | * | 11/2002 | Tateyama et al. ............ 428/36.9 |
| 6,854,522 B2 | | 2/2005 | Brezinski et al. |
| 6,896,063 B2 | | 5/2005 | Chang et al. |
| 6,907,936 B2 | | 6/2005 | Fehr et al. |
| 6,907,937 B2 | | 6/2005 | Whanger et al. |
| 6,976,537 B1 | | 12/2005 | Verret |
| 6,977,057 B2 | | 12/2005 | Reitz et al. |
| 7,045,082 B2 | | 5/2006 | Dietzen et al. |
| 7,109,249 B2 | | 9/2006 | Bruza et al. |
| 7,268,193 B2 | | 9/2007 | Marrocco, III et al. |
| 7,291,201 B2 | | 11/2007 | Duh et al. |
| 7,387,158 B2 | | 6/2008 | Murray et al. |
| 7,392,852 B2 | | 7/2008 | Richard |
| 7,615,476 B2 | | 11/2009 | Hua |
| 7,655,705 B2 | | 2/2010 | Scherzer et al. |
| 7,743,825 B2 | | 6/2010 | O'Malley et al. |
| 8,048,348 B2 | | 11/2011 | Duan et al. |
| 8,167,190 B1 | | 5/2012 | Bullock et al. |
| 8,519,505 B2 | | 8/2013 | Hiroshige et al. |
| 8,604,157 B2 | | 12/2013 | Gerrard et al. |
| 8,939,222 B2 | | 1/2015 | Ren et al. |
| 2003/0032739 A1 | | 2/2003 | Kerres et al. |
| 2003/0069082 A1 | | 4/2003 | Sullivan |
| 2003/0132271 A1 | | 7/2003 | Kao et al. |
| 2004/0112478 A1 | | 6/2004 | Bieler et al. |
| 2004/0138321 A1 | | 7/2004 | Hashimoto et al. |
| 2004/0259446 A1 | | 12/2004 | Jain et al. |
| 2004/0266940 A1 | | 12/2004 | Issari |
| 2005/0089688 A1 | * | 4/2005 | Mungioli et al. .......... 428/411.1 |
| 2005/0205263 A1 | | 9/2005 | Richard |
| 2006/0011267 A1 | | 1/2006 | Kay et al. |
| 2006/0019090 A1 | | 1/2006 | Wessling |
| 2006/0045395 A1 | | 3/2006 | Shimazu et al. |
| 2006/0051540 A1 | | 3/2006 | Kagawa |
| 2006/0124304 A1 | | 6/2006 | Bloess et al. |
| 2006/0125136 A1 | | 6/2006 | Kratzmuller |
| 2007/0020417 A1 | | 1/2007 | Murakami |
| 2007/0021549 A1 | * | 1/2007 | Kojima et al. ................ 524/540 |
| 2007/0072828 A1 | | 3/2007 | Yoo |
| 2007/0106050 A1 | | 5/2007 | Sokolowski et al. |
| 2007/0240877 A1 | | 10/2007 | O'Malley et al. |
| 2008/0161453 A1 | | 7/2008 | Lee et al. |
| 2008/0220567 A1 | | 9/2008 | Mahler et al. |
| 2009/0036605 A1 | | 2/2009 | Ver Meer |
| 2009/0084539 A1 | | 4/2009 | Duan et al. |
| 2009/0131557 A1 | | 5/2009 | Uyama et al. |
| 2009/0242850 A1 | | 10/2009 | Park et al. |
| 2010/0012708 A1 | | 1/2010 | Steward et al. |
| 2010/0089565 A1 | | 4/2010 | Duan et al. |
| 2010/0210813 A1 | | 8/2010 | Foder et al. |
| 2011/0003955 A1 | | 1/2011 | Nishino et al. |
| 2011/0052444 A1 | | 3/2011 | Hrametz et al. |
| 2011/0139314 A1 | | 6/2011 | Ho et al. |
| 2011/0144223 A1 | | 6/2011 | Sriram et al. |
| 2011/0162788 A1 | | 7/2011 | Mizrahi |
| 2012/0090830 A1 | | 4/2012 | O'Malley et al. |
| 2012/0178834 A1 | | 7/2012 | Linder et al. |
| 2012/0305238 A1 | | 12/2012 | Duan et al. |
| 2013/0062049 A1 | | 3/2013 | Ren et al. |
| 2013/0256991 A1 | | 10/2013 | Ramon et al. |

FOREIGN PATENT DOCUMENTS

| | | |
|---|---|---|
| JP | 9096186 A | 4/1997 |
| WO | 9207024 A1 | 4/1992 |
| WO | 03014517 A1 | 2/2003 |
| WO | 2005052316 A2 | 6/2005 |
| WO | 2005059304 A1 | 6/2005 |
| WO | 2007101845 | 9/2007 |
| WO | 2010095139 | 8/2010 |

OTHER PUBLICATIONS

Dan Lu et al., "Effects of Ball Milling Dispersion of Nano-SiOx Particles on Impact Strength and Crystallization Behavior of Nano-SiOx-Poly(phenylene sulfide) Nanocomposites," Polymer Engineering and Science, 2006, pp. 820-825.

Patrick T. Mather et al., "Shape Memory Polymer Research," Annu. Res. Mater. Res. 2009 39: pp. 445-471.

Qinghao Meng et al., "A Review of shape memory polymer composites and blends," Composites: Part A vol. 40, 2009, pp. 1661-1672.

Richard T. Hawkins, "Chemistry of the Cure of Poly(p-phenylene sulfide)" Macromolecules, vol. 9.No. 2, 1976, pp. 189-194.

Collins et al., "Thermal Fatigue and Failure Analysis of SnAgCu Solder Alloys with Minor Pb Additions", IEEE Transactions on Components, Packaging and Manufacturing Tech. vol. 1, No. 10 (Oct. 2011).

Fu Guo, "Composite lead-free electronic solders", J Mater Sci: Mater Electron 18:129-145 (2007).

International Search Report and Written Opinion; International Application No. PCT/US2012/045550; International filing date: Jul. 5, 2012; Date of mailing Jan. 25, 2013; 8 pages.

International Search Report and Written Opinion; International Application No. PCT/US2012/045552; International filing date: Jul. 5, 2012; Date of mailing Jan. 25, 2013; 8 pages.

International Search Report and Written Opinion; International Application No. PCT/US2012/054083; International filing date: Sep. 7, 2012; Date of mailing Dec. 14, 2012 (8 pages).

International Search Report for International Application No. PCT/US2012/057033; International filing date: Sep. 25, 2012; Date of mailing: Mar. 29, 2013 (4 pgs).

International Search Report for International Application No. PCT/US2012/059682; International filing date: Oct. 11, 2012; Date of mailing: Mar. 29, 2013 (4 pgs).

International Search Report for International Application No. PCT/US2012/061098; International filing date: Oct. 19, 2012; Date of mailing: Mar. 12, 2013 (3 pgs).

Mather et al., "Shape Memory Polymer Research"; Annu. Rev. Mater. Res.; 39; pp. 445-471; (2009).

Qinghao Meng et al., "A Review of shape memory polymer composites and blends"; Composites: Part A, vol. 40; pp. 1661-1672 (2009).

PCT International Search Report and Written Opinion; International Application No. PCT/US2013/069076; International Filing Date: Nov. 8, 2013; Date of Mailing: Feb. 27, 2014; pp. 1-9.

PrimoSpire PR-250 Product Data Sheet, Solvay Specialty Polymers, Sep. 28, 2010, 3 pages.

Ren et al. "Development and Characterization of an Elastomeric Material for High-Pressure and High-Temperature Downhole Sealing Applications". Presentation at 2011 World Oil HPHT Drilling and Completion Conference; Abstract Date Mar. 11, 2011 (1 page).

Sun et al., "Preparation, characterization, and mechanical properties of some microcellular polysulfone foams", Journal of Applied Polymer Science, vol. 86, Issue 7, pp. 1692-1701, Nov. 14, 2002.

Takemoto et al., "Electrochemical Migration Tests of Solder Alloys in Pure Water", Corrosion Science, vol. 39, No. 8. pp. 1415-1430 (1997).

* cited by examiner

US 9,144,925 B2

SHAPE MEMORY POLYPHENYLENE SULFIDE MANUFACTURING, PROCESS, AND COMPOSITION

BACKGROUND

Shape memory polymers (SMPs) are polymers that regain their original shape when heated above their glass transition temperature (Tg). Articles are formed from shape memory polymers by first heating above the glass transition temperature and then shaping the polymer, then subsequently fixing the shape by cooling below the glass transition temperature. During deployment of the article, the shaped article is heated above the glass transition temperature to allow recovery of the first molded shape.

Shape memory polymers are useful as materials of construction of elements for variety of downhole applications, particularly those that require the sealing off a portion of a borehole or constricting the space around an element, whether coaxial with the borehole or otherwise. While a number of different shape memory polymers are commercially available, SMPs having still greater thermal and chemical stability as well as low cost would be well received in the art.

BRIEF DESCRIPTION

Disclosed is a process for making shape memory polyphenylene sulfide, comprising: curing polyphenylene sulfide to produce cured polyphenylene sulfide; comminuting the cured polyphenylene sulfide to form cured polyphenylene sulfide particles; disposing the cured polyphenylene sulfide particles in a mold; heating the mold for flowing the cured polyphenylene sulfide; compressing, by applying a compressive force, the cured polyphenylene sulfide; cooling the cured polyphenylene sulfide; relieving the compressive force; and de-molding the cured polyphenylene sulfide to produce the shape memory polyphenylene sulfide.

Also disclosed is a process for making shape memory polyphenylene sulfide, comprising: compounding polyphenylene sulfide with a crosslinking agent; disposing the polyphenylene sulfide in a mold; heating the mold for crosslinking the polyphenylene sulfide to produce cured polyphenylene sulfide; compressing, by applying a compressive force, the cured polyphenylene sulfide; cooling the cured polyphenylene sulfide; relieving the compressive force; and de-molding the cured polyphenylene sulfide to produce the shape memory polyphenylene sulfide.

Further disclosed is a process for making a downhole element for sealing a borehole, comprising: curing polyphenylene sulfide to produce cured polyphenylene sulfide; disposing the cured polyphenylene sulfide in a mold; heating the mold for flowing the cured polyphenylene sulfide; compressing, by applying a compressive force, the cured polyphenylene sulfide; cooling the cured polyphenylene sulfide; relieving the compressive force; de-molding the cured polyphenylene sulfide to produce a shape memory polyphenylene sulfide in an original shape; heating the shape memory polyphenylene sulfide to a temperature greater than or equal to the glass transition temperature of the cured polyphenylene sulfide; deforming, by applying a deformation stress, the shape memory polyphenylene sulfide into a run-in shape; and cooling the shape memory polyphenylene sulfide to fix the shape memory polyphenylene sulfide in the run-in shape.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Cured polyphenylene sulfide as disclosed herein is prepared by thermal cure of polyphenylene sulfide in the presence of oxygen or in an inert environment. The cured polyphenylene sulfide has lower crystallinity (i.e., is more amorphous) and greater thermal stability, chemical resistance, and mechanical strength than the polyphenylene sulfide prior to curing as well as improved shape memory properties such as more rapid recovery rate and near-quantitative recovery of at least one pre-compression dimension. Methods herein include curing polyphenylene sulfide prior to molding the cured polyphenylene sulfide and also, alternatively, curing polyphenylene sulfide during molding, which can be accomplished by one or more heat treatments. Cured polyphenylene sulfide produced via these methods is elastomeric at high temperatures and exhibits shape memory effects.

Figure 1:
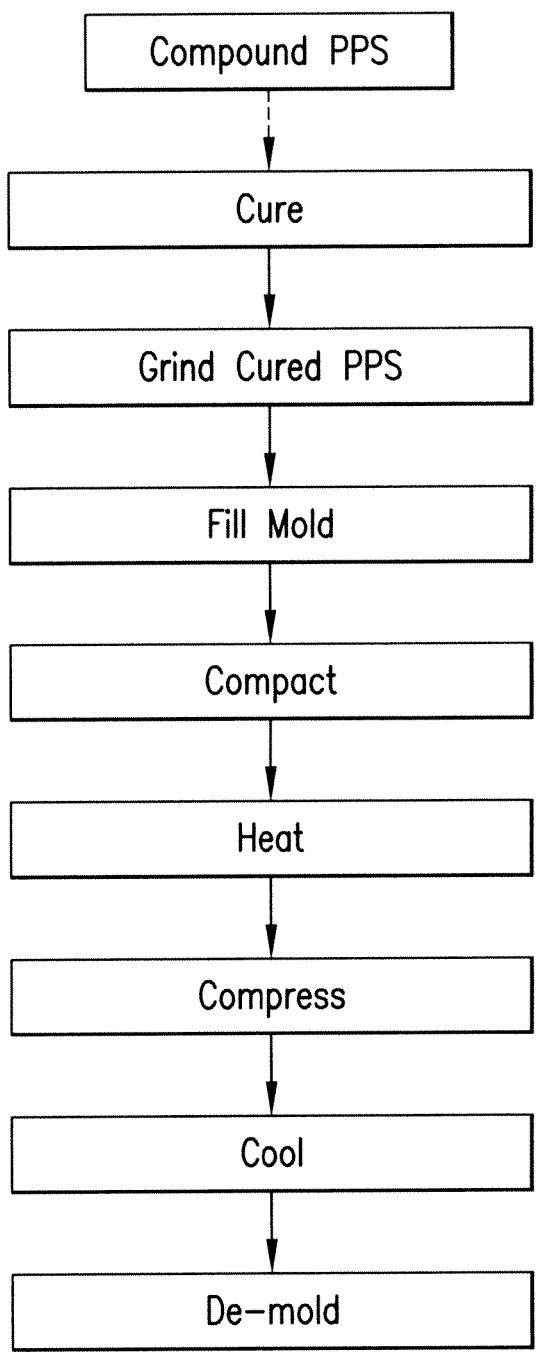
FIG. 1 is a flow chart showing a process for making shape memory polyphenylene sulfide according to curing polyphenylene sulfide before molding the cured polyphenylene sulfide.

As shown in FIG. 1, in an embodiment, a process for making shape memory polyphenylene sulfide includes curing polyphenylene sulfide to produce cured polyphenylene sulfide; comminuting the cured polyphenylene sulfide to form cured polyphenylene sulfide particles; disposing the cured polyphenylene sulfide particles in a mold; heating the mold for flowing the cured polyphenylene sulfide; compressing, by applying a compressive force, the cured polyphenylene sulfide; cooling the cured polyphenylene sulfide; relieving the compressive force; and de-molding the cured polyphenylene sulfide to produce the shape memory polyphenylene sulfide. Here, the polyphenylene sulfide is cured before molding and without combining the polyphenylene sulfide with a crosslinking agent combined with the polyphenylene sulfide prior to cure. Thus, crosslinking the polyphenylene sulfide can occur by curing in the presence of oxygen alone. Oxygen can come from a supply of oxygen gas or air, and either oxygen source can be mixed with an inert gas or nitrogen.

Figure 2:
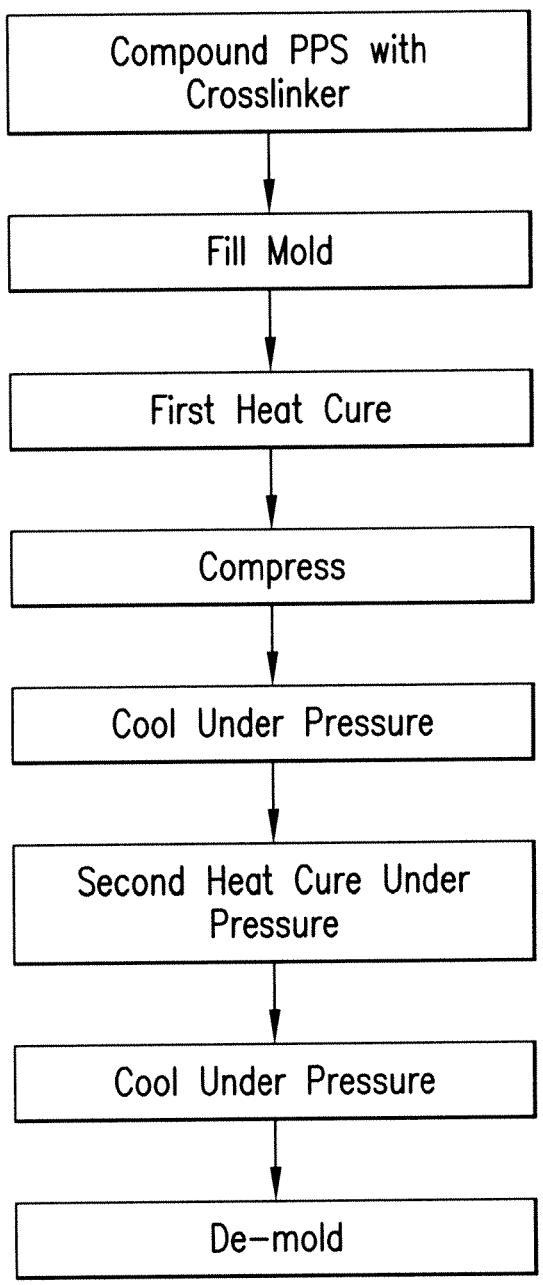
FIG. 2 is a flow chart showing a process for making shape memory polyphenylene sulfide according to curing polyphenylene sulfide during molding.

In another, non-limiting embodiment, a process for making shape memory polyphenylene sulfide includes compounding the polyphenylene sulfide with a crosslinking agent and disposing the polyphenylene sulfide in a mold as shown in the flow chart of FIG. 2. The method includes heating the mold for crosslinking the polyphenylene sulfide to produce cured polyphenylene sulfide. The polyphenylene is heated in the mold during a first heat cure process so that the polyphenylene sulfide can cure. During the first heat cure process, some of the polyphenylene sulfide may not cure. A compressive force is applied to the polyphenylene sulfide in the mold to compress the polyphenylene sulfide followed by cooling (e.g., to a temperature below the glass transition temperature of the cured polyphenylene sulfide, or alternatively cooling to a temperature above the glass transition temperature). While the polyphenylene sulfide is still compressed, the mold is heated again in a second heat cure process. Here, the temperature of the second heat cure process can be less than that of the first heat cure process. After the second heat cure process, the mold is maintained under pressure and cooled to a temperature below or above the Tg of the cured polyphenylene sulfide. The compressive force is then relieved. The cured polyphenylene sulfide is de-molded to produce the shape memory polyphenylene sulfide. Although cooling can be to a temperature greater than the Tg, when the compressive force is relieved, the cured polyphenylene sulfide retains the shape of the mold. Here, curing the polyphenylene sulfide occurs during heating the mold whereas in a previous embodiment, the polyphenylene sulfide is cured before filling the mold with cured polyphenylene sulfide particles. Moreover, a crosslinking agent beyond oxygen is present with the polyphenylene sulfide during cure in this embodiment.

Figure 3:
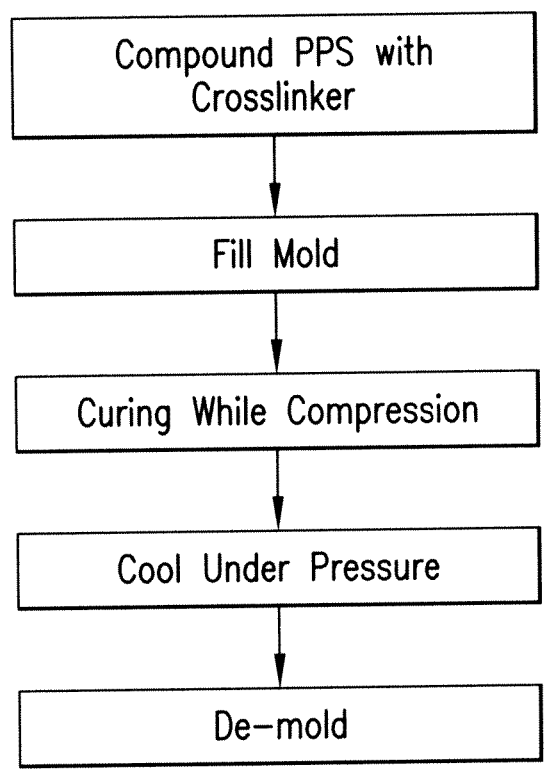
FIG. 3 is a flow chart showing another process for making shape memory polyphenylene sulfide according to curing polyphenylene sulfide during molding.

In a further embodiment, as shown in FIG. 3, the polyphenylene sulfide is compounded with a crosslinker and disposed in a mold. Pressure is applied to the polyphenylene sulfide in the mold as the mold is heated to cure the polyphenylene sulfide. Thereafter, the polyphenylene sulfide (still under pressure) is cooled to a temperature that is above or below its Tg. Pressure is then relieved, and then the cured polyphenylene sulfide is de-molded from the mold to obtain a polyphenylene sulfide shape memory polymer having an original shape (i.e., a shape and size of the mold). Again, in this embodiment, curing the polyphenylene sulfide occurs during heating in the mold whereas in a previous embodiment the polyphenylene sulfide is cured before filling the mold with cured polyphenylene sulfide particles.

According to an embodiment, the polyphenylene sulfide is compounded with an additive prior to curing the polyphenylene sulfide. Additives are described more fully below and can include reinforcing and nonreinforcing additives, for example. Compounding can also include combining the polyphenylene sulfide with a reactive elastomer or fluoropolymer, which is also described below. Additionally, the polyphenylene sulfide can be combined with an additional polymer prior to curing. Such polymers and additives, described below, vary the mechanical and chemical properties of the cured polyphenylene sulfide.

Compounding includes, for example, combining uncured polyphenylene sulfide powder or pellets with the various additives under conditions to blend these components together. Compounding can be performed in a ball-mill for blending and grinding, two-roll mill, vibratory mill, attritor, high shear blending process, or acoustic blending process such as by using a Resodyn Acoustic Mixer. The compounding can also be melt-compounding such as by a twin-screw extruder.

Comminuting can include various ways of producing smaller particles from the cured polyphenylene sulfide prior to introducing cured polyphenylene sulfide particles into the mold. For example, the cured polyphenylene sulfide can be ground by a commercial blender, milled in a ball mill to produce particles, or extruded and subsequently cut to produce pellets. The particles size relative to the largest linear dimension of the cured polyphenylene sulfide particles can be about 20 mesh or smaller. In an embodiment, the particles size is about 10 micrometers (μm) to about 1000 μm, specifically about 100 μm to about 750 μm, and more specifically about 250 μm to about 500 μm.

In an embodiment, the polyphenylene sulfide is compacted before heating the mold. Compacting can occur when, for example, particles of cured polyphenylene sulfide are disposed in the mold before heating. Alternatively, the polyphenylene sulfide can be compacted in the mold after heating has commenced in order to decrease the amount of gas trapped among the polyphenylene sulfide particles.

Heating the mold causes the polyphenylene sulfide to flow. In an embodiment, heating causes crosslinking between the polyphenylene sulfide chains. In an embodiment, the crosslinking involves crosslinks formed linking the polyphenylene sulfide chains with a crosslinking agent added to the polyphenylene sulfide. In another non-restrictive embodiment, the polyphenylene is cured by oxygen from an oxygen source such as oxygen gas or air. In a further embodiment involving heating cured polyphenylene sulfide particles in the mold, the polyphenylene sulfide particles flow and can further form crosslinks among the polyphenylene sulfide of different particles, which can occur due to introduction of oxygen from an oxygen source (e.g., oxygen gas or oxygen from air) between chains of the polyphenylene sulfide.

According to an embodiment, the cured polyphenylene sulfide is heated in the mold to a temperature greater than the glass transition temperature (Tg) of the cured polyphenylene sulfide. The temperature can be, for example, about 320° C. to about 420° C., specifically about 340° C. to about 410° C., and more specifically about 350° C. to about 400° C. While the cured polyphenylene sulfide is at a temperature greater than its Tg, a compressive force is applied. The force is, for example, about 10,000 pounds to about 25,000 pounds, specifically about 12,000 to about 20,000 pounds, and more specifically about 15,000 psi to about 20,000 pounds, when the force is applied to an area of one square inch. Under compression and heat, the polyphenylene sulfide attains the shape of the mold. The cured polyphenylene sulfide is then cooled (for example, to room temperature) below or above the Tg of the cured polyphenylene sulfide to obtain the shape memory polyphenylene sulfide in its original shape. Additional processing of the shape memory polyphenylene sulfide can occur to produce downhole elements that take advantage of the properties of the shape memory polyphenylene sulfide.

In another embodiment, uncured polyphenylene sulfide is placed in a mold and heated in a first heat cure process to a temperature that is, for example, about 320° C. to about 420° C., specifically about 340° C. to about 410° C., and more specifically about 350° C. to about 400° C., and held at this temperature for about 4 hours to about 8 hours. While the polyphenylene sulfide is at the elevated temperature, a compressive force is applied. The force is, for example, about 10,000 pounds to about 25,000 pounds, specifically about 12,000 to about 20,000 pounds, and more specifically about 15,000 pounds to about 20,000 pounds, when the force is applied to an area of one square inch. The temperature is reduced below or above the Tg of the cured polyphenylene sulfide, for example, to a temperature of about 25° C. to about 110° C. The temperature is increased in a second heat cure process to about 290° C. to about 340° C. for about 18 hours to 22 hours. The cured polyphenylene sulfide is then cooled to below or above its Tg, and then de-molded to obtain the shape memory polyphenylene sulfide in its original shape.

In another embodiment, uncured polyphenylene sulfide is placed in a mold and heated for curing the polyphenylene sulfide to a temperature that is, for example, about 320° C. to about 420° C., specifically about 340° C. to about 410° C., and more specifically about 350° C. to about 400° C., and held at this temperature for about 4 hours to about 48 hours. During heating, a compressive force is applied so that the polyphenylene sulfide is compressed during curing. The force is, for example, about 10,000 pounds to about 25,000 pounds, specifically about 12,000 to about 20,000 pounds, and more specifically about 15,000 pounds to about 20,000 pounds, when the force is applied to an area of one square inch. The temperature is then reduced below or above the Tg of the cured polyphenylene sulfide, for example, to a temperature of about 25° C. to about 110° C. and then de-molded to obtain the shape memory polyphenylene sulfide in its original shape.

As discussed above the, the polyphenylene sulfide is decreased to a temperature above or below its Tg. The temperature to which the polyphenylene sulfide is cooled can be about 25° C. to about 110° C. If the cured polyphenylene sulfide is de-molded at these temperatures (or lower), it will maintain the shape of the mold.

In an embodiment, the cured polyphenylene sulfide can be cooled to a temperature below the glass transition temperature of the cured polyphenylene sulfide before de-molding (i.e., removal from the mold) to fix the shape and size of the cured polyphenylene sulfide. Alternatively, the cured polyphenylene sulfide can de-molded before cooling below its Tg but thermally quenched below its Tg after de-molding to retain the shape and size of the mold so that the shape memory polyphenylene sulfide is in the original shape. Since the polyphenylene sulfide was either disposed in the mold as cured particles and compacted or cured within the mold, the shape of the cured polyphenylene sulfide after de-molding is the shape of the mold, i.e., in the original shape. Due to the shape memory property of the shape memory polyphenylene sulfide, the polyphenylene sulfide can be heated above its Tg, deformed under stress into another shape (different from the mold, i.e., the original shape), and cooled below the Tg (while under the stress) to retain the new shape. Subsequent heating again to a temperature greater than the Tg without an applied stress allows the shape memory polyphenylene sulfide to return to its original shape. As used herein, "original shape" refers to the shape and size of the shape memory polyphenylene sulfide provided by the mold. As just briefly discussed, further processing of the shape memory polyphenylene sulfide can alter the shape memory polyphenylene sulfide by changing it from the original shape to a different shape and/or size.

The polyphenylene sulfide herein has a thermal stability greater than its melting temperature (Tm) of about 280° C. and a thermal decomposition temperature, of greater than or equal to about 300° C., specifically greater than or equal to about 400° C., and more specifically greater than about 425° C. relative to the polymer's 60 minute half-life. Prior to cure, the polyphenylene sulfide is semi-crystalline, but after curing, the cured polyphenylene sulfide is more amorphous and, at high temperatures, elastic.

The polyphenylene sulfide has a weight averaged molecular weight (Mw) of about 500 grams/mole (g/mol) to about 100,000 g/mol, specifically about 1,000 to about 75,000 g/mol, more specifically about 1,000 to about 50,000 g/mol, and still more specifically about 1,000 to about 30,000 g/mol. In addition, the polyphenylene sulfide has a melt flow determined according to ASTM D 1283 at 316° C. under a 5 kg load, of less than or equal to about 7,500 g/10 minutes, specifically less than or equal to about 6,500 g/10 minutes, and still more specifically less than or equal to about 5,500 g/10 minutes and greater than about 75 g/10 minutes.

The polyphenylene sulfide is linear or is branched, having a number of branches of greater than or equal to 1, specifically greater than or equal to 2, or more specifically greater than or equal to 6 branching points per 1,000 carbon atoms along the polymer chain. Further, the molecular weight can be different among the linear and branched forms of the polyphenylene sulfide. Particularly, the molecular weight of linear polyphenylene sulfide is about 20,000 g/mol to about 100,000 g/mol, more particularly about 20,000 g/mol to about 70,000 g/mol, and the molecular weight of a branched thermoplastic polymer is about 20,000 g/mol to about 100,000 g/mol, more particularly about 20,000 g/mol to about 75,000 g/mol.

Structurally, the polyphenylene sulfide (PPS) can be a branched structure, for example, branched PPS marketed under the tradename RYTON® by Chevron-Phillips, or a linear structure, such linear PPS marketed under the tradename FORTRON® by Ticona. In a specific embodiment, the thermoplastic polymer is branched. The polyphenylene sulfide is obtained and used in pellet or powder form. Further, the polyphenylene sulfide may be p-polyphenylene sulfide, m-polyphenylene sulfide, o-polyphenylene sulfide, or a combination thereof. The polyphenylene sulfide can further be chemically modified to include, for example, functional groups such as halogen, alcohol, ether, ester, amide, etc. groups, or can be oxidized, hydrogenated, etc.

In another embodiment, a reactive elastomer or fluoropolymer is blended with the polyphenylene sulfide before cure, and grafts to the polyphenylene sulfide during cure to increase flexibility of the cured polyphenylene sulfide. In an alternative embodiment, the reactive elastomer or fluoropolymer is blended with the polyphenylene sulfide before cross-linking. Exemplary useful reactive elastomers or fluoropolymers include polytetrafluoroethylene (PTFE), nitrile-butyl rubber (NBR), hydrogenated nitrile-butyl rubber (HNBR), high fluorine content fluoroelastomers rubbers such as those in the FKM family and marketed under the tradename VITON® fluoroelastomers (available from FKM-Industries) and perfluoroelastomers such as FFKM (also available from FKM-Industries) and marketed under the tradename KALREZ® perfluoroelastomers (available from DuPont), and VECTOR® adhesives (available from Dexco LP), organopolysiloxanes such as functionalized or unfunctionalized polydimethylsiloxanes (PDMS), tetrafluoroethylene-propylene elastomeric copolymers such as those marketed under the tradename AFLAS® and marketed by Asahi Glass Co., ethylene-propylene-diene monomer (EPDM) rubbers, polyvinylalcohol (PVA), and the like, and combinations comprising at least one of the foregoing polymers.

The cured polyphenylene sulfide is prepared by curing in the presence or absence of oxygen. Oxygen is included during curing as either pure oxygen or a mixture of gases. Where a mixture of gases is used, oxygen is mixed with any suitable inert gas such as, for example, nitrogen, helium, argon, carbon dioxide, or the like. In an embodiment, curing is carried out in air. Curing is carried out at ambient pressure, at a partial pressure lower than ambient, or at elevated pressures (>1 atmosphere).

In an embodiment, the cured polyphenylene sulfide has a thermal decomposition temperature greater than or equal to about 400° C. The polyphenylene sulfide can be cured at a temperature of about 200° C. to about 400° C., specifically about 250 to about 390° C., and more specifically about 320° C. to about 360° C. The curing time is for a total time of less than or equal to 200 hours, more specifically less than or equal to about 80 hours. According to an embodiment, the cure time is from about 1 hour to about 75 hours. In an embodiment, where curing is in the presence of oxygen and/or a crosslinking agent, the curing time is for a total time of less than or equal to about 72 hours, specifically less than or equal to about 48 hours, and still more specifically less than or equal to about 24 hours. In an exemplary embodiment, curing is carried out at a temperature of about 320° C. to about 360° C., for a time of about 1 to about 20 hours, specifically about 2 to about 6 hours, in air atmosphere at ambient pressure. In another exemplary embodiment, curing is carried out at a temperature of about 320° C. to about 360° C., for a time of about 1 to about 200 hours, in the absence of oxygen and at ambient pressure. It will be understood that where the curing temperature is close to or at about the thermal decomposition temperature of the polyphenylene sulfide, a combination of curing temperature and time is used such that during curing, the cured polyphenylene sulfide material exhibits less than or equal to 10% weight loss, specifically less than 5% weight loss, and more specifically less than 1% weight loss.

Without being bound by theory, the mechanism involved in curing the polyphenylene sulfide includes, for example, chain extension, oxidative crosslinking, thermal crosslinking, oxygen uptake followed by loss of $SO_2$, and a combination thereof. The degree of crosslinking can be regulated by control of the curing process, such as controlling the curing temperature, curing time, and curing environment, for example, varying the relative amounts of the polyphenylene sulfide and oxygen. Further, controlling the curing process can regulate the degree of crystallinity. In an embodiment, the cured polyphenylene sulfide is amorphous. In another embodiment, the cured polyphenylene sulfide has a high degree of crystallinity, based on the degree of curing.

The cured polyphenylene sulfide is partially cured, or fully cured. Where the polyphenylene sulfide is fully cured, the cured polyphenylene sulfide is completely amorphous, without showing a melting temperature ($T_m$) transition as determined by, for example, differential scanning calorimetry (DSC), which corresponds to the melting of any of the crystalline regions of the semi-crystalline high temperature polyphenylene sulfide. Alternatively, the cured polyphenylene sulfide is partially cured, where analysis by DSC shows a reduction in the heat flow at the melting temperature ($T_m$) relative to that of the uncured polyphenylene sulfide. Where the cured polyphenylene sulfide is only partially cured, the cured polyphenylene sulfide is semi-crystalline. As used herein, "semi-crystalline" means having a degree of crystallinity less than that of the uncured polyphenylene sulfide. For example, where the polyphenylene sulfide is about 30% crystalline (based on weight or volume) prior to curing, the cured polyphenylene sulfide after partial cure can be about 10% crystalline. Partial cure can also be localized, based on the degree of exposure of the polyphenylene sulfide to the oxygen atmosphere during curing. For example, where the polyphenylene sulfide is provided as a pellet or particle, partial cure is obtained where the outermost, exposed portion (surface or layer) of a particle of the cured polyphenylene sulfide is cured and has a low crystallinity (e.g., less than or equal to about 5% crystallinity, specifically less than or equal to about 2% crystallinity, and more specifically less than or equal to about 1% crystallinity, based on volume), or is fully amorphous, while the interior of the pellet or particle is uncured. The portion cured, in this instance, corresponds to the diffusion depth of the oxygen into the pellet or particle during cure, and varies with variation in cure condition, i.e., temperature, pressure, oxygen concentration, and time. In an embodiment, the polyphenylene sulfide is stirred (intermittently or continuously) during cure to increase the amount of oxygen available to crosslink the internal portion of the polyphenylene sulfide by elevating the overall exposure of the polyphenylene sulfide to oxygen.

Both the uncured polyphenylene sulfide and the cured polyphenylene sulfide each have a glass transition temperature $T_g$ higher than ambient temperature. In an embodiment, the cured polyphenylene sulfide has a $T_g$, corresponding to the amorphous regions, of greater than or equal to about 80° C., specifically greater than or equal to about 90° C., and more specifically greater than or equal to about 100° C.

In an embodiment, the cured polyphenylene sulfide has a storage modulus of greater than or equal to about 1 megapascal (MPa), more specifically about 1.2 MPa, and still more specifically greater than or equal to about 1.5 MPa, determined at a temperature of greater than or equal to about 250° C., greater than or equal to about 275° C., and more specifically greater than or equal to about 300° C.

In another embodiment, the polyphenylene sulfide is compounded with an additive prior to curing and is then cured to form the cured polyphenylene sulfide. Additive, as broadly used herein, includes any compound added to the polyphenylene sulfide to adjust the properties of the cured polyphenylene sulfide, and includes for example a material such as a water-soluble additive useful for preparing a foam, or other additive such as a filler, crosslinking agent, or processing aid.

Fillers, as used herein, include reinforcing and non-reinforcing fillers. Reinforcing fillers include, for example, silica, glass fiber, carbon fiber, or carbon black, which can be added to the polymer matrix to increase strength. Non-reinforcing fillers such as polytetrafluoroethylene (PTFE), molybdenum disulfide ($MoS_2$), or graphite can be added to the polymer matrix to increase the lubrication. Nanofillers are also useful, and are reinforcing or non-reinforcing. Nanofillers, such as carbon nanotubes, nanographene, nanoclay, polyhedral oligomeric silsesquioxane (POSS), or the like, can be incorporated into the polymer matrix to increase the strength and elongation of the material. Nanofillers can further be functionalized to include grafts or functional groups to adjust properties such as solubility, surface charge, hydrophilicity, lipophilicity, and other properties. Combinations comprising at least one of the foregoing fillers can be used.

The crosslinking agent, where included, is for example a sulfur donor, elemental sulfur, silica, a quinone, a peroxy compound, a metal peroxide, a metal oxide, or a combination comprising at least one of the foregoing crosslinking agents. Examples of the sulfur donor include alkyl polysulfides, thiuram disulfides, and amine polysulfides. Some non-limiting examples of suitable sulfur donor agents are 4,4'-dithiomorpholine, dithiodiphosphorodisulfides, diethyldithiophosphate polysulfide, alkyl phenol disulfide, tetramethylthiuram disulfide, 4-morpholinyl-2-benzothiazole disulfide, dipentamethylenethiuram hexasulfide, and caprolactam disulfide. Exemplary quinones include p-benzoquinone, tetramethylbenzoquinone, naphthoquinone, and the like. Peroxy compounds useful as crosslinking agents include alkyl or aryl diperoxy compounds, and metal peroxides. Exemplary aryl diperoxy compounds include those based on dicumyl peroxide (DCP) and marketed by Arkema, Inc. under the tradename DI-CUP® including, DI-CUP® dialkyl peroxide, DI-CUP® 40C dialkyl peroxide (on calcium carbonate support), DI-CUP® 40K dialkyl peroxide, DI-CUP® 40KE dialkyl peroxide; and alkyl diperoxy compounds including 2,5-dimethyl-2,5-di(t-butylperoxy)hexane and marketed by Akzo-Nobel under the tradename TRIGONOX® 101. Exemplary metal peroxides include magnesium peroxide, calcium peroxide, zinc peroxide, or the like, or a combination comprising at least one of the foregoing. Metal oxides useful as crosslinking agents include, for example, zinc oxide, magnesium oxide, titanium dioxide, or the like, or a combination comprising at least one of the foregoing.

A processing aid is a compound included to improve flow, moldability, and other properties of the cured polyphenylene sulfide. Processing aids include, for example an oligomer, a wax, a resin, a fluorocarbon, or the like, or a combination comprising at least one of the foregoing. Exemplary processing aids include stearic acid and derivatives, low molecular weight polyethylene, and the like.

The polyphenylene sulfide can be crosslinked alone or in the presence of another polymer in order to obtain the desired properties of the crosslinked product. However, the presence of other polymers may reduce chemical resistance. Thus, in an embodiment, no other polymer is present during crosslinking. If used, in order to maintain the desired properties of the crosslinked polyphenylene sulfide, any amount of the additional polymers are limited, being present for example in amount of 0.01 to 20 weight percent (wt. %), 0.1 to 10 wt. %, or 1 to 5 wt. % of the total weight of the polymers present (i.e., polyphenylene sulfide all other polymers). For example, if used, aromatic thermoplastic polymers can be present, such as aromatic polyamides, polyimides, polyetherimides, polyaryletherketones (PAEK), polyetherether ketones (PEEK), polyether sulfones (PESU), polyphenylene sulfones (PPSU), polyphenylene sulfone ureas, self-reinforced polyphenylene, or the like, or combinations comprising at least one of the foregoing. Polymers containing oxygen include, for example, acetal resins (e.g., polyoxymethylene (POM)), polyester resins (e.g., poly(ethylene terephthalate) (PET), poly(butylene terephthalate) (PBT), and poly(ethylene naphthalate) (PEN)), polyarylates (PAR), poly(phenylene ether) (PPE), polycarbonate (PC), aliphatic polyketones (e.g., polyketone (PK)), poly(ether ketones) (polyetherketone (PEK), polyetherketoneketone (PEKK), and polyetherketone etherketone ketone (PEKEKK)), and acrylic resins (e.g., polymethylmethacrylate (PMMA)) can be used. The additional polymer can be linear or branched, homopolymers or copolymers, and used alone or in combination with one or more other aromatic thermoplastic polymers. Copolymers include random, alternating, graft, and block copolymers, the block copolymers having two or more blocks of different homopolymers, random copolymers, or alternating copolymers.

In an embodiment, a peroxide initiator is compounded with the polyphenylene sulfide before or after curing. Peroxide initiators include, for example, inorganic and organic peroxides such as ketone peroxides, diacyl peroxides, diakyl peroxides, peroxyesters, peroxyketals, hydroperoxides, peroxydicarbonates, and peroxymonocarbonates. Exemplary peroxide initiator compounds include, but are not limited to, hydrogen peroxide, peroxydisulfate salts, persulfate salts acetylacetone peroxide, methylethylketone peroxide, cyclohexanone peroxide, methylisobutylketone peroxide; benzoyl peroxide, lauroyl peroxide, isobutyryl peroxide, acetyl peroxide, 2,4-dichlorobenzoyl peroxide, succinic acid peroxide, decanoyl peroxide, diisononanoyl peroxide; tert-butyl peroxide-2-ethyl hexanoate; 1,1-ditert-butylperoxy -3,3,5-trimethyl cyclohexane, and 1,3-bis(tert-butylperoxyisopropyl) benzene. The peroxide initiator is used in an amount known in the art, for example, about 0.01 to about 20 weight percent (wt. %), specifically about 0.5 to about 5 wt. %, and more specifically about 0.5 to about 2 wt. %, based on the weight of the polyphenylene sulfide.

In preparing a mixture for a shape memory foam containing cured polyphenylene sulfide, a water-soluble additive is included. Exemplary water-soluble additives include salts such as sodium chloride, potassium chloride, potassium iodide, sodium sulfate, or other salt having a high solubility in water. Pore size, closed versus open cell porosity, and pore distribution are controlled in foams by the concentration and particle size of the water-soluble additive.

In an embodiment, the cured polyphenylene sulfide is open cell foam. The open cells are voids in the foam that allow communication of a fluid through the pores of the open cell foam. The blowing agent used to create the foam can be a physical blowing agent or chemical blowing agent. Examples of the blowing agent include hydrochlrorofluorocarbons, hydrocarbons (for example, pentane, isopentane, and cyclopentane), $CO_2$, and water.

According to another embodiment, the cured polyphenylene sulfide is a closed cell foam. The closed cells are voids in the foam that are not in communication but contain a fluid, which is a gas or liquid. Examples of the fluid include air, inert gas, sulfur-containing compounds, oxygen-containing compounds, or a combination thereof. The fluid can be produced during polymerization or curing or can be from a blowing agent as well as entrapment of, e.g., ambient gases in the closed cells.

In a further embodiment, the cured polyphenylene sulfide is a solid. Although the solid may contain some pores, it will be understood that the closed or open cell foam differs from the solid cured polyphenylene sulfide at least in part due to the number density and uniformity of pores that characterize open and closed cell foams. Thus, in a non-restrictive embodiment, the solid may be substantially void free.

As briefly mentioned previously, the cured polyphenylene sulfide can be comminuted prior to any compounding and/or molding. Comminuting is done by any suitable method including use of a mortar and pestle, ball mill, grinder, or the like, so long as the particle size of the resultant comminuted cured polyphenylene sulfide is suitable for adequate mixing. Any suitable particle size can be obtained by the comminuting. In an embodiment, the cured polyphenylene sulfide is pulverized into a particle size of less than or equal to about 10 mesh, specifically less than or equal to about 20 mesh, and more specifically less than or equal to about 40 mesh. It will be understood that "less than" a mesh size refers to particle size defined by mesh number that is inversely correlated to particle size, i.e., the higher the mesh number, the smaller the particle size.

The shape memory material is prepared by, for example, curing the polyphenylene sulfide in the presence of oxygen, compacting the cured thermoplastic polymer at a low processing temperature (for example, at less than or equal to about 200° C.), heating the cured polyphenylene sulfide to a temperature greater than the glass transition temperature of the cured polyphenylene sulfide, compression molding the cured polyphenylene sulfide, and de-molding at a temperature less than the glass transition temperature of the cured polyphenylene sulfide. Curing and heating are effected in the same or in separate steps.

Without being bound by theory, it is believed that the degree of crosslinking of the polyphenylene sulfide partially determines the degree of shape memory of the shape memory material. That is, a shape memory polyphenylene sulfide with a greater degree of crosslinking more completely recovers its original shape and/or size (e.g., volume, in the case of open or closed cell foams) than a shape memory polyphenylene sulfide having a lesser degree of crosslinking. The degree of crosslinking can be controlled by, for example, the molecular weight of the polyphenylene sulfide that is used for curing.

Heating the cured polyphenylene sulfide, generally as distinguished from curing, is similarly carried out at a temperature of about 200° C. to about 400° C., specifically about 250 to about 400° C., and more specifically about 300° C. to about 400° C. The heating time is for greater than or equal to 2 hours, specifically greater than or equal to about 5 hours, and still more specifically about 5 to about 20 hours. Heating, in this instance, refers to heating the cured polyphenylene sulfide above its glass transition temperature after compacting, to impart the mold's shape on the cured polyphenylene sulfide particles as they flow together and coalescence to a single mass of cured polyphenylene sulfide. During heating in the mold, additional curing may occur due to the presence of oxygen.

Alternatively, the shape memory material is prepared by compounding the polyphenylene sulfide with a crosslinking agent and optionally, an additive, to form a mixture, filling a mold with the mixture, compacting the mixture at room temperature in the mold, and heating the compacted mixture in the mold in the presence of oxygen or without oxygen to a temperature greater than the glass transition temperature of the cured thermoplastic polymer. A heating time of less than or equal to about 200 hours is used to cure the thermoplastic polymer; when heating is done in the presence of oxygen, a shorter heating time of less than or equal to about 24 hours is used, and when heating is done in the absence of oxygen, a longer heating time less than or equal to 200 hours is used to cure the polyphenylene sulfide. Compression of the cured thermoplastic polymer in the mold to a temperature greater than the glass transition temperature of the cured polyphenylene sulfide, and de-molding at a temperature less than the glass transition temperature of the cured polyphenylene sulfide are then carried out. In this embodiment, heating is carried out at a temperature sufficient to cure the thermoplastic polymer, and hence curing and heating to above the glass transition temperature of the cured polyphenylene sulfide are effected in the same step.

According to an embodiment, the shape memory polyphenylene sulfide is a solid body. In an alternative embodiment in which the shape memory polyphenylene sulfide is a foam, the polyphenylene sulfide is compounded with a water-soluble additive, prior to curing. The water-soluble additive is then removed after de-molding, for example by soaking and/or extracting the de-molded article with a suitable solvent (such as water, where a water-soluble additive is used), carried out in batch or continuous mode, at ambient or elevated temperatures and pressures. In another embodiment, the shape memory polyphenylene sulfide is a closed cell foam having a fluid (gas or liquid) in the cells. Without being bound by theory, a shape memory polyphenylene sulfide that is a closed cell foam may have a shorter recovery time (as compared with the recovery time for an open cell foam) from its compacted shape because of additional stored energy due to the compression of the fluid in the closed cells.

The shape memory polyphenylene sulfide so prepared exhibits improved shape memory properties when compared with a comparable shape memory material but prepared with an uncured polyphenylene sulfide. For example, a shape memory polyphenylene sulfide, prepared using the cured polyphenylene sulfide, and when compacted by 30% based on its original volume, has a recovery time during deployment of less than or equal to about 10 minutes, measured at about 10 pounds per square inch (psi) at about 160° C. Also, a shape memory polyphenylene sulfide prepared using the cured polyphenylene sulfide, and when compacted by about 30% based on its original volume, recovers greater than or equal to about 90%, specifically greater than or equal to about 93%, more specifically greater than or equal to about 95%, and still more specifically greater than or equal to about 97%, of at least one dimension. It will be understood that shape recovery dimensions are determined upon deployment by heating the shape memory polyphenylene sulfide at or above the glass transition temperature of the cured polyphenylene sulfide.

Furthermore, the shape memory polyphenylene sulfide shows high resistance when exposed to a chemical agent at a temperature greater than room temperature and pressure greater than atmospheric pressure. In this way, the shape memory polyphenylene sulfide shows less reduction in properties such as, for example, glass transition temperature, than a comparable shape memory material prepared with an uncured polyphenylene sulfide. In particular, the shape memory polyphenylene sulfide, and the cured polyphenylene sulfide, resist swelling and degradation of properties when exposed to chemical agents (e.g., water, brine, hydrocarbons, acids such as sulfuric acid, solvents such as toluene, etc.), even at elevated temperatures of up to 100° C., and at elevated pressures (greater than atmospheric pressure) or prolonged periods (e.g., of greater than one day).

The shape memory polyphenylene sulfide is useful for preparing elements for downhole applications. Exemplary elements include a packer element, a sand screen, a blow out preventer element, a submersible pump motor protector bag, a sensor protector, a sucker rod, an O-ring, a T-ring, a gasket, a sucker rod seal, a pump shaft seal, a tube seal, a valve seal, a seal for an electrical component, an insulator for an electrical component, a seal for a drilling motor, a seal for a drilling bit, or other downhole elements.

In an additional embodiment, a downhole element, e.g., a packer element or sand screen, includes shape memory polyphenylene sulfide. The polyphenylene sulfide is crosslinked as described above. Additionally, the shape memory polyphenylene sulfide is a solid (i.e., substantially without pores or other voids). The solid shape memory polyphenylene sulfide is thermally activated between an actuated and unactuated shape. The thermal activation of the shape memory polyphenylene sulfide is in response to application of heat to the downhole element to a temperature greater than or equal to the glass transition temperature of the cured polyphenylene sulfide.

Figure 4:
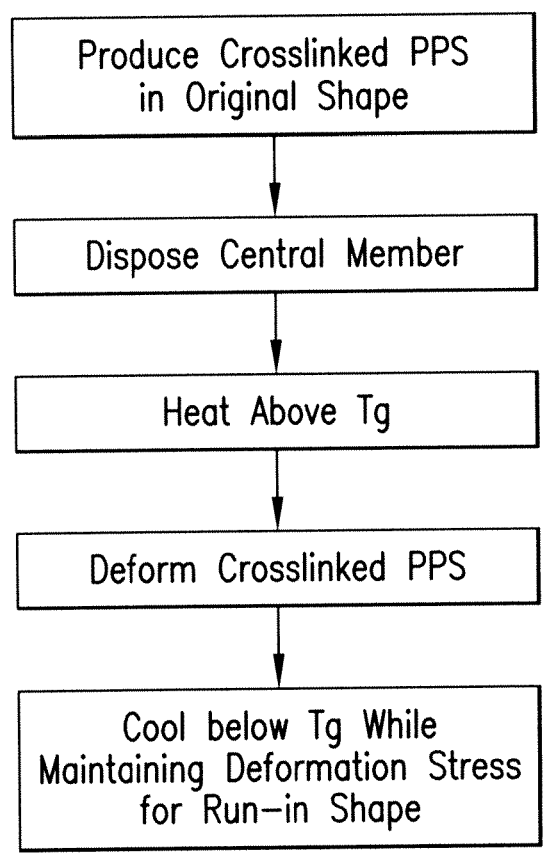
FIG. 4 is a flow chart showing a process for producing a downhole element from shape memory polyphenylene sulfide.

According to an embodiment, the downhole element includes one of the above embodiments for producing a shape memory polyphenylene sulfide in an original shape. Here, the downhole element can be a packer for sealing or isolating a borehole. In this case, a tube is disposed in the mold, and cured (or alternatively uncured) polyphenylene sulfide is surroundingly disposed about the tube. The process involves curing polyphenylene sulfide to produce cured polyphenylene sulfide in the mold, if the polyphenylene sulfide is not cured; heating the mold for flowing the cured polyphenylene sulfide about the tube; compressing, by applying a compressive force, the cured polyphenylene sulfide; cooling the cured polyphenylene sulfide; relieving the compressive force; and de-molding the cured polyphenylene sulfide to produce a shape memory polyphenylene sulfide in an original shape about the tube. As illustrated in the flow chart shown in FIG. 4, the shape memory polyphenylene sulfide is removed from the mold, and the tube is removed to reveal the shape memory polyphenylene sulfide in an annular original shape. A central member, for example a second tube, is disposed in the inner diameter of the shape memory polyphenylene sulfide, and the assembly (central member and shape memory polyphenylene sulfide) is heated to a temperature (e.g., 250° C.) that is greater than the Tg of the cured polyphenylene sulfide. While heated above the Tg, the shape memory polyphenylene sulfide is subjected to a deformation stress, for example, stretching, to decrease its outer diameter. The inner diameter of the shape memory polyphenylene sulfide does not change during stretching because of the support provided by the central member. The temperature is decreased (e.g., cooled to room temperature) below the Tg of the cured polyphenylene sulfide to fix the elongated shape with diminished outer diameter, i.e., the shape memory polyphenylene sulfide is deformed to a run-in shape (suitable for run-in downhole). The applied stress is then relieved, leaving the shape memory polyphenylene sulfide in run-in shape (but still having a high degree of internal strain). In a non-limiting embodiment, the run-in shape can be further manipulated by cutting away a portion of the cured material at the top or bottom of the article in order to create a shorter shape memory material. However, when the shape memory polyphenylene sulfide is heated to a temperature greater than its Tg, the shape memory polyphenylene sulfide returns to its original shape having the outer diameter of the mold. Even if the length of the shape memory polyphenylene sulfide has been decreased, for example, by cutting away a certain length of the material, the outer diameter will still be expanded to that of the original size before application of the deformation stress.

Figure 5:
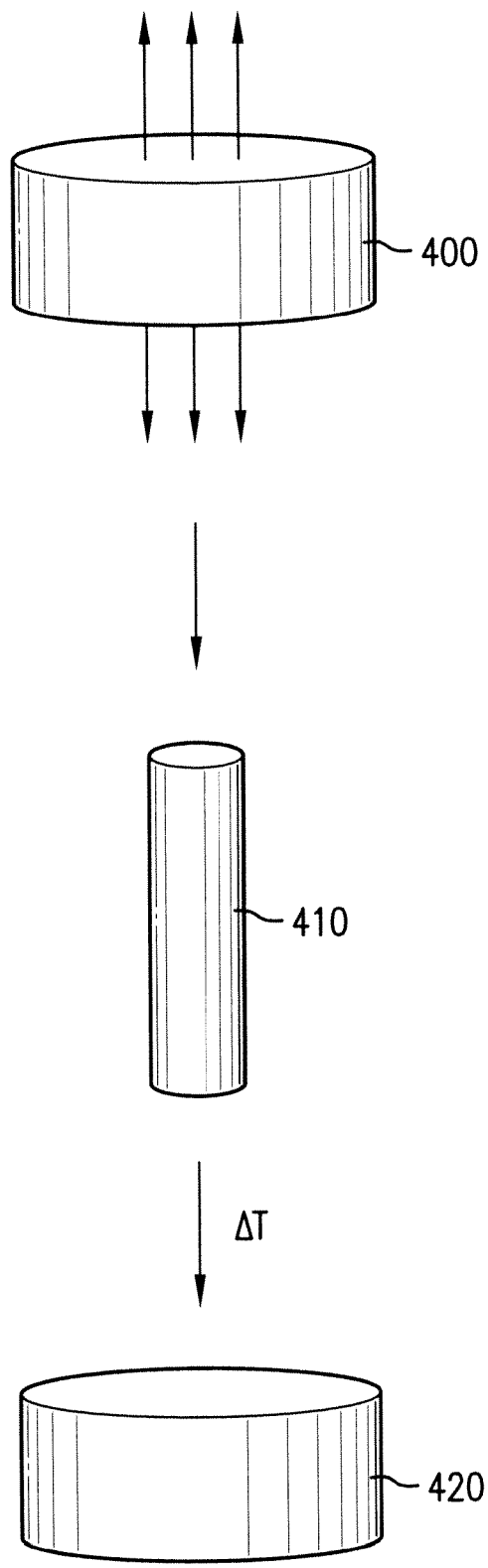
FIG. 5 illustrates actuation and deployment of a downhole element made of shape memory polyphenylene sulfide.

FIG. 5 illustrates switching between the original shape and the run-in shape. As shown in FIG. 5, a cylindrical shape memory polyphenylene sulfide packer 400 is stretched perpendicular to its outer diameter at a temperature greater than the Tg of the cured polyphenylene sulfide and then cooled below Tg to fix the shape memory material in a run-in shape 410. Upon heating, without an applied stress, to a temperature greater than the Tg of the cured polyphenylene sulfide, the packer returns to its original shape 420.

Figure 6:
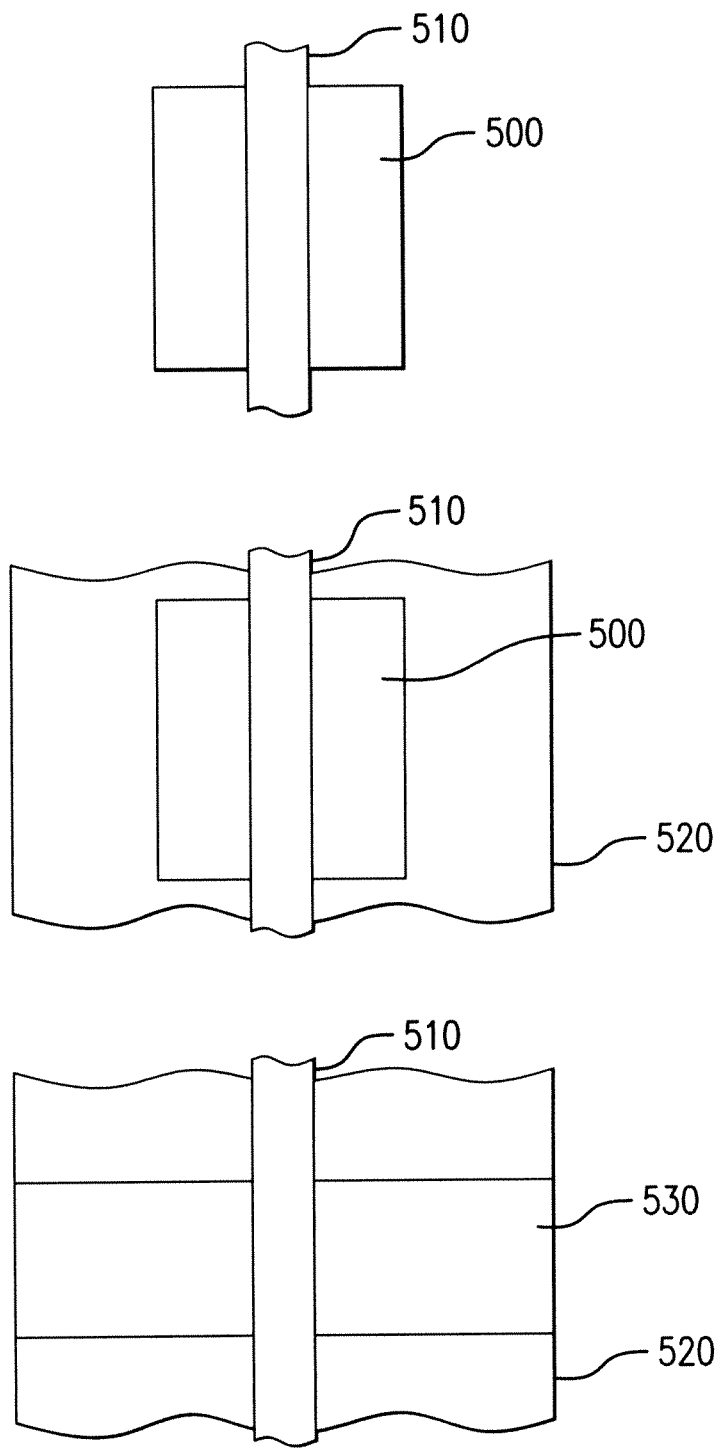
FIG. 6 illustrates downhole deployment of a downhole element made of shape memory polyphenylene sulfide.

In a further embodiment, as shown in FIG. 6, a downhole element (e.g., a packer) of shape memory polyphenylene sulfide in a run-in shape 500 is placed on a string or downhole tool 510 and run downhole in a borehole having a wall or casing 520. The shape memory material includes crosslinked polyphenylene sulfide that is the molecular switch to actuate the shape memory effect between the original shape 530 and the run-in shape 500. The cured polyphenylene sulfide is a robust material that is resistant to the corrosive downhole environment. Deployment of the shape memory polyphenylene sulfide is thermally triggered. That is, when the temperature of the downhole environment is equal to or greater than the Tg of the cured polyphenylene sulfide, the shape memory material is deployed from the run-in shape 500 to the original shape 530. In the case of the downhole element being a packer, the outer diameter of the packer expands to the original shape to seal the borehole. Here, the downhole element either completely seals the borehole for total isolation thereof or only seals an annular portion thereof, depending on the presence of other items such as production tube. Thus, the downhole element can either have an aperture (e.g., for acceptance of a central member) or can be aperture-free.

The Tg of the cured polyphenylene sulfide is designed to be greater than the ambient temperature but lower than the downhole temperature such that shape memory polyphenylene sulfide is not prematurely deployed. The Tg can be controlled to a certain value, e.g., by blending with another polymer, such as polyphenylene sulfone, which has a Tg of about 230° C. The Tg of the polyphenylene sulfide and polyphenylene sulfone blend can be controlled to about 100° C. to about 230° C. Consequently, the cured polyphenylene sulfide has a Tg that is lower than the downhole temperature or close (within, e.g., 5° C.) to the downhole temperature.

The above embodiments are further demonstrated in the following examples, which are intended as illustrative only and are not intended to be limited thereto.

Curing of Polyphenylene Sulfide. A bar sample of polyphenylene sulfide (PPS; RYTON® PR09-60, Chevron-Phillips) was cured at 680° F. (360° C.) in air for 2 hours, and evaluated by differential scanning calorimetry (DSC; TA Instruments; scan rate 10° C./min.).

Figure 7:
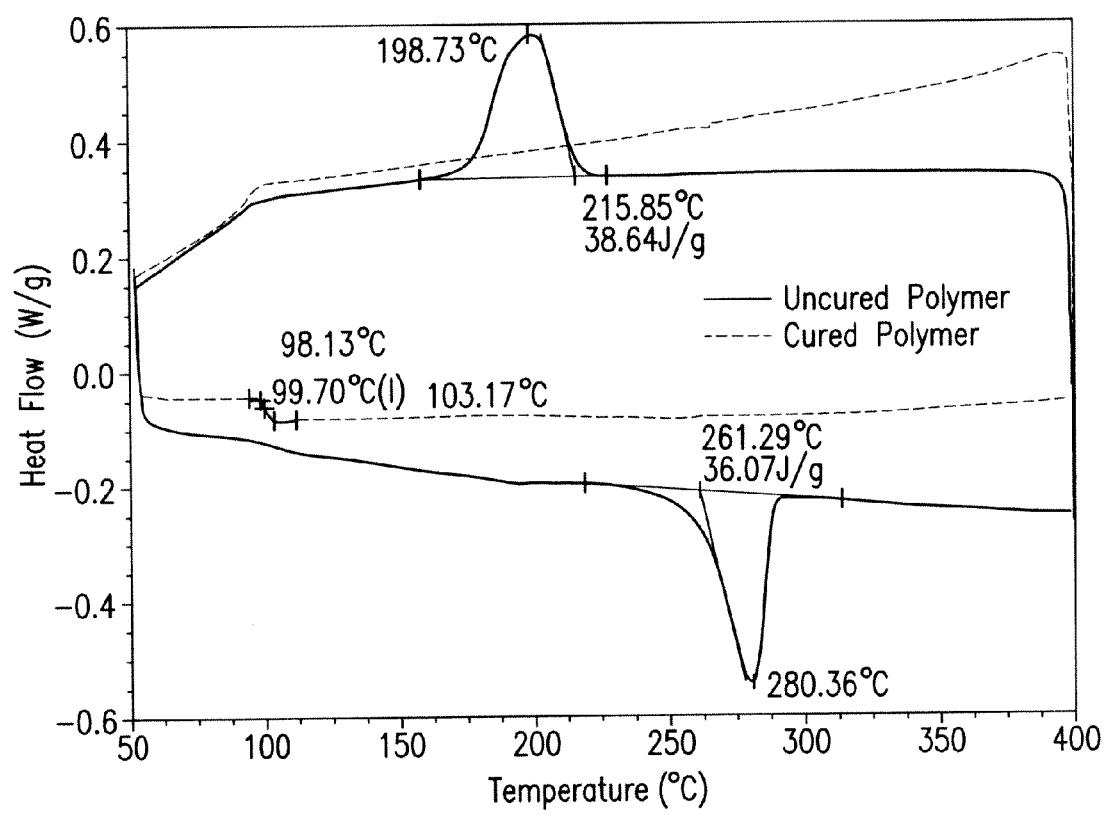
FIG. 7 shows a differential scanning calorimetry (DSC) trace of an uncured and cured polyphenylene sulfide.

FIG. 7 shows the DSC trace (as a plot of Watts per gram versus temperature in ° C.). As seen in FIG. 7, an uncured sample of PPS exhibited a melting temperature ($T_m$) for the crystalline regions of about 280.4° C. (solid line), whereas the cured PPS exhibited only a glass transition temperature at about 99.7° C. Curing therefore renders the PPS amorphous as shown by the disappearance of the $T_m$ transition.

Figure 8:
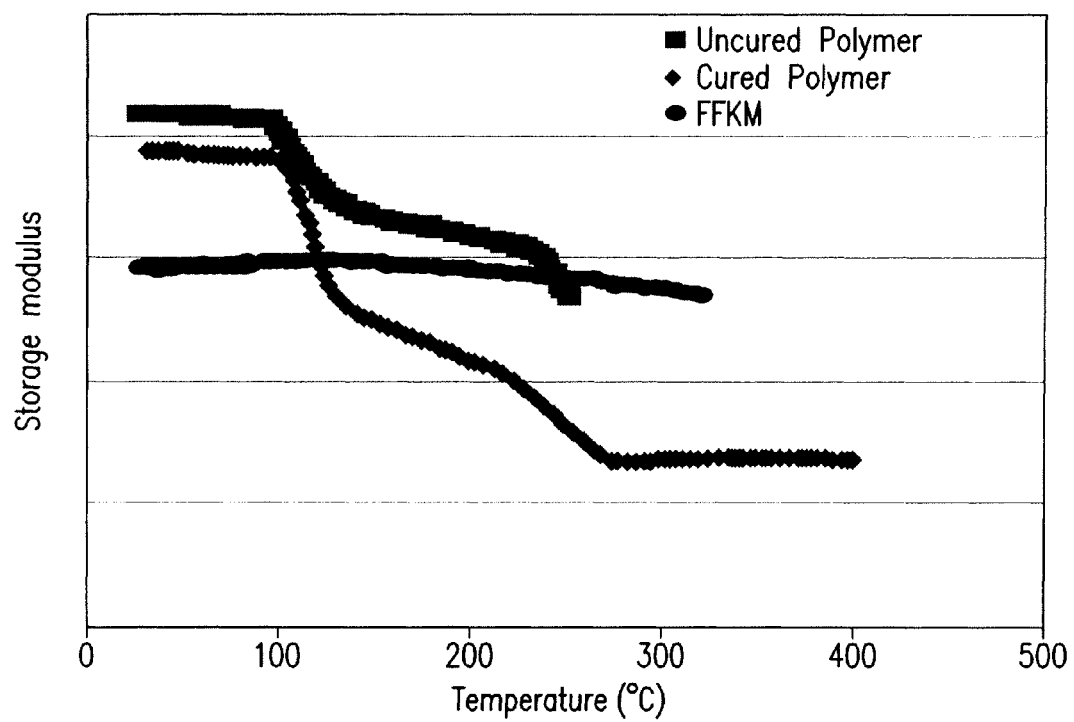
FIG. 8 is a dynamic mechanical analysis (DMA) plot of storage modulus versus temperature for a perfluoroelastomer and an uncured and cured polyphenylene sulfide.

FIG. 8 further shows a dynamic mechanical analysis (DMA) trace comparison for the cured PPS, the uncured PPS, and a perfluoroelastomer (FFKM K0090 from FKM Industries). As seen in FIG. 8, the storage modulus of cured PPS remained stable to 400° C., whereas the storage modulus of uncured PPS remained stable only to about 260° C., and that of the perfluoroelastomer remained stable only to about 320° C.

Shaped Memory of Cured PPS. Polyphenylene sulfide compacted pellets (PPS; RYTON® P-4, Chevron-Phillips) were pulverized to 20 or 40 mesh size and cured at 680° F. (360° C.) under air atmosphere for 2 hours. The cured PPS was disposed in a button mold and compacted at room temperature, followed by heating to 680° F. (360° C.) under air atmosphere for 4 hours. The button mold was compressed to 30% of its original height and heated to about the Tg of the cured PPS, and the molded cured PPS was then quenched in cold water after de-molding.

The button prior to compaction had a height of 5.84 mm, and after compaction and quench had a height of 4.74 mm (a compaction of 19%). Upon deployment by heating to 360° C., the deployed button had a height of 5.66 mm, for a height dimension recovery of about 97%. In addition, dynamic mechanical analysis (DMA; 10 psi pressure, 160° C.) of a similarly prepared pellet shows, upon deployment, dimensional recovery in less than 7 minutes.

While one or more embodiments have been shown and described, modifications and substitutions may be made thereto without departing from the spirit and scope of the invention. Accordingly, it is to be understood that the present invention has been described by way of illustrations and not limitation.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed:

1. A process for making shape memory polyphenylene sulfide, comprising:
compounding polyphenylene sulfide with a crosslinking agent;
disposing the compounded polyphenylene sulfide in a mold;
heating the mold to a temperature of about 320° C. to about 420° C. for initiating curing of the disposed polyphenylene sulfide in the presence of the crosslinking agent;
compressing, by applying a compressive force to the heated polyphenylene sulfide to produce cured polyphenylene sulfide;
cooling the cured polyphenylene sulfide;
relieving the compressive force; and
de-molding the cooled, cured polyphenylene sulfide to produce the shape memory polyphenylene sulfide;
wherein the crosslinking gent comprises a sulfur donor, sulfur, silica, peroxy compound, metal oxide, metal peroxide, or a combination comprising at least one of the foregoing crosslinking agents.

2. The process of claim 1, wherein the crosslinking agent is the sulfur donor comprising 4,4'-dithiomorpholine, dithiodiphosphorodisulfides, diethyldithiophosphate polysulfide, alkyl phenol disulfide, tetramethylthiuram disulfide, 4-morpholinyl-2-benzothiazole disulfide, dipentamethylenethiuram hexasulfide, and caprolactam disulfide, or a combination comprising at least one of the foregoing sulfur donors.

3. The process of claim 1, wherein the crosslinking agent is the peroxy compound comprising an alkyl diperoxy compound, an aryl diperoxy compounds, or a combination comprising at least one of the foregoing peroxy compounds.

4. The process of claim 1, wherein the crosslinking agent is the metal peroxide comprising magnesium peroxide, calcium peroxide, zinc peroxide, or a combination comprising at least one of the foregoing metal peroxides.

5. The process of claim 1, wherein compounding comprises ball milling, grinding, high-shear blending, acoustic blending, melt compounding, or a combination comprising at least one of the foregoing.

6. The process of claim 1, wherein curing is performed in the presence of oxygen.

7. The process of claim 1, wherein curing is performed in an inert atmosphere.

8. The process of claim 1, wherein the polyphenylene sulfide has a molecular weight from about 500 g/mol to about 100,000 g/mol.

9. The process of claim 1, wherein curing is at a temperature from about 320° C. to about 400° C. for about 1 hour to about 70 hours.

10. The process of claim 1, wherein cooling the cured polyphenylene sulfide is to a temperature below or above the glass transition temperature of the cured polyphenylene sulfide before de-molding.

11. The process of claim 1, wherein compounding further comprises combining the polyphenylene sulfide with an additive prior to disposing the polyphenylene sulfide in the mold.

12. The process of claim 11, wherein the additive is a filler comprising silica, glass fiber, carbon fiber, carbon black, polytetrafluoroethylene, $MoS_2$, graphite, carbon nanotubes, nanographene, nanoclay, polyhedral oligomeric silsesquioxane, or a combination comprising at least one of the foregoing fillers.

13. The process of claim 12, wherein the carbon nanotubes, nanographene, nanoclay, polyhedral oligomeric silsesquioxane are functionalized.

14. The process of claim 11, wherein the additive is a processing aid comprising an oligomer, wax, resin, fluorocarbon, or a combination comprising at least one of the foregoing processing aids.

15. The process of claim 1, wherein compounding further comprises combining a reactive elastomer or fluoropolymer with the polyphenylene sulfide before cure, wherein the reactive elastomer or fluoropolymer grafts to the polyphenylene sulfide during cure to increase flexibility of the cured polyphenylene sulfide.

16. The process of claim 1, wherein compounding further comprises combining the polyphenylene sulfide with an additional polymer prior to disposing the polyphenylene sulfide in the mold.

17. The process of claim 16, wherein the additional polymer comprises an aromatic thermoplastic polymer, oxygen containing polymer, or a combination comprising at least one of the foregoing additional polymers.

18. A process for making a downhole element for sealing a borehole, comprising:
curing polyphenylene sulfide to produce cured polyphenylene sulfide;
disposing the cured polyphenylene sulfide in a mold;
heating the mold for flowing the disposed, cured polyphenylene sulfide;
compressing, by applying a compressive force, the heated, cured polyphenylene sulfide;
cooling the compressed, cured polyphenylene sulfide;
relieving the compressive force;
de-molding the cooled, cured polyphenylene sulfide to produce a shape memory polyphenylene sulfide in an original shape;
heating the shape memory polyphenylene sulfide to a temperature greater than or equal to the glass transition temperature of the cured polyphenylene sulfide;
deforming, by applying a deformation stress, the heated shape memory polyphenylene sulfide into a run-in shape; and
cooling the deformed shape memory polyphenylene sulfide to fix the deformed shape memory polyphenylene sulfide in the run-in shape.

19. The process of claim 18, wherein the downhole element is thermally deployed from the run-in shape to the original shape.

20. The process of claim 18, wherein the downhole element has an annular shape.

21. The process of claim 18, wherein the downhole element is aperture-free.

22. The process of claim 18, wherein curing the phenylene sulfide comprises curing the phenylene sulfide in the presence of a crosslinking agent.

23. The process of claim 1, wherein heating the molding to a temperature of about 320° C. to about 420° C. is for about 4 hours to about 48 hours.

24. The process of claim 1, the method comprising heating the mold to a temperature of about 340° C. to about 410° C. for initiating curing of the disposed polyphenylene sulfide in the presence of the crosslinking agent.

25. The process of claim 1, the method comprising heating the mold to a temperature of about 350° C. to about 400° C. for initiating curing of the disposed polyphenylene sulfide in the presence of the crosslinking agent.

26. A process for making shape memory polyphenylene sulfide, the method comprising:
compounding polyphenylene sulfide with a crosslinking agent;

disposing the compounded polyphenylene sulfide in a mold;

heating the compounded polyphenylene in the mold to initiate curing of the disposed polyphenylene sulfide;

compressing, by applying a compressive force to the heated compounded polyphenylene sulfide to produce an initially cured polyphenylene sulfide;

cooling the initially cured polyphenylene sulfide;

heating the initially cured polyphenylene sulfide to further cure the initially cured polyphenylene sulfide in the mold;

cooling the further cured polyphenylene sulfide;

relieving the compressive force; and de-molding the cooled, further cured polyphenylene sulfide to produce the shape memory polyphenylene sulfide.

27. The process of claim 26, wherein cooling the initially cured polyphenylene sulfide is to a temperature of about 25° C. to about 110° C.

28. The process of claim 26, wherein heating the compounded polyphenylene in the mold is at a temperature of about 320° C. to about 420° C.

29. The process of claim 26, wherein heating the initially cured polyphenylene sulfide is at a temperature of at about 290° C. to about 340° C.

30. The process of claim 26, wherein heating the initially cured polyphenylene sulfide is conducted in the mold under pressure.

31. The process of claim 26, wherein the crosslinking agent comprises a sulfur donor, sulfur, silica, peroxy compound, metal oxide, metal peroxide, or a combination comprising at least one of the foregoing crosslinking agents.

32. The process of claim 26, wherein compounding further comprises combining the polyphenylene sulfide with an additive prior to disposing the polyphenylene sulfide in the mold.

33. The process of claim 32, wherein the additive is a filler comprising silica, glass fiber, carbon fiber, carbon black, polytetrafluoroethylene, $MoS_2$, graphite, carbon nanotubes, nanographene, nanoclay, polyhedral oligomeric silsesquioxane, or a combination comprising at least one of the foregoing fillers.

34. The process of claim 32, wherein the additive is a processing aid comprising an oligomer, wax, resin, fluorocarbon, or a combination comprising at least one of the foregoing processing aids.

35. The process of claim 32, wherein compounding further comprises combining a reactive elastomer or fluoropolymer with the polyphenylene sulfide before cure, wherein the reactive elastomer or fluoropolymer grafts to the polyphenylene sulfide during cure to increase flexibility of the cured polyphenylene sulfide.

36. The process of claim 32, wherein compounding further comprises combining the polyphenylene sulfide with an additional polymer prior to disposing the polyphenylene sulfide in the mold.

37. The process of claim 36, wherein the additional polymer comprises an aromatic thermoplastic polymer, oxygen containing polymer, or a combination comprising at least one of the foregoing additional polymers.

* * * * *